United States Patent
Hayashi et al.

[11] Patent Number: 5,906,900
[45] Date of Patent: May 25, 1999

[54] NON-AQUEOUS SOLVENT SECONDARY BATTERY ELECTRODE MATERIAL AND PROCESS FOR PREPARING THE SAME

[75] Inventors: Manabu Hayashi; Shoji Yamaguchi; Fumikazu Mizutani; Keiko Nishioka; Shoichiro Mori, all of Ami-machi, Japan

[73] Assignee: Mitsubishi Chemical Corporation, Tokyo, Japan

[21] Appl. No.: 08/615,183
[22] PCT Filed: Jul. 31, 1995
[86] PCT No.: PCT/JP95/01519
 § 371 Date: May 31, 1996
 § 102(e) Date: May 31, 1996
[87] PCT Pub. No.: WO96/04688
 PCT Pub. Date: Feb. 15, 1996

[30] Foreign Application Priority Data

Aug. 4, 1994 [JP] Japan ............................... 183479/1994

[51] Int. Cl.⁶ ..................................................... H01M 4/38
[52] U.S. Cl. .................................... 429/231.8; 423/445 R
[58] Field of Search ................................... 429/194, 218, 429/209, 231.8; 423/445 R

[56] References Cited

U.S. PATENT DOCUMENTS

| | | | |
|---|---|---|---|
| 5,310,553 | 5/1994 | Simon et al. | 429/212 |
| 5,344,726 | 9/1994 | Tanaka et al. | 429/209 |
| 5,401,598 | 3/1995 | Miyabayashi et al. | 429/218 |

FOREIGN PATENT DOCUMENTS

| | | |
|---|---|---|
| 0 517 070 | 12/1992 | European Pat. Off. . |
| 0 520 667 | 12/1992 | European Pat. Off. . |
| 0 549 802 | 7/1993 | European Pat. Off. . |

*Primary Examiner*—Stephen Kalafut
*Attorney, Agent, or Firm*—Oblon, Spivak, McClelland, Maier & Neustadt, P.C.

[57] ABSTRACT

Disclosed are an electrode material for a non-aqueous solvent secondary battery, which comprises a composite carbonaceous material in which to the surface of a graphite carbonaceous material is attached a carbonized material of an organic substance in an amount to give a carbon residue of 12 parts by weight or less and 0.1 part by weight or more based on 100 parts by weight of the graphite carbonaceous material, and a process for preparing an electrode material for a non-aqueous solvent secondary battery, which comprises the steps of introducing a slurry obtained by adding an aromatic organic solvent to a mixture of graphite carbonaceous material particles and an organic substance and adjusting viscosity to 10000 cp or lower into a mixing and stirring apparatus having a reaction room which has a paddle rotatable by a shaft in an inner portion thereof, the inner wall surface of the reaction room being formed substantially along the outermost line of rotation of the paddle and also, being provided a mechanism of deaerating a solvent, heating it to a temperature of the boiling point of the solvent or higher and lower than 600° C. while stirring to prepare a solid intermediate and heating said intermediate to 600° C. or higher under inert gas atmosphere to effect carbonization. According to the non-aqueous solvent secondary battery electrode material of the present invention, there can be provided a non-aqueous solvent secondary battery in which good electric characteristics that while maintaining discharging capacity which is as high as graphite, irreversible capacity can be suppressed to extremely low and charging efficiency is excellent can be obtained and further stability to an electrolyte is improved. Also, according to the preparation process of the present invention, a composite carbonaceous material having such high characteristics and uniform characteristics can be prepared stably with good efficiency.

15 Claims, 3 Drawing Sheets

NON-AQUEOUS SOLVENT SECONDARY BATTERY ELECTRODE MATERIAL AND PROCESS FOR PREPARING THE SAME

TECHNICAL FIELD

This invention relates to an electrode material to be used for a non-aqueous solvent secondary battery and a process for preparing the same, particularly to an electrode material having a multiphase structure and a process for preparing the same.

BACKGROUND ART

In recent years, accompanied with miniaturization of electronic equipments, a secondary battery having high capacity has been required. Attention has been paid particularly to a non-aqueous solvent secondary battery having higher energy density as compared with nickel-cadmium and nickel-metal hydride batteries. As a negative electrode material thereof, a metal, graphite, etc. have heretofore been studied. However, in a metal electrode, there is a problem that when charging and discharging are repeated, a metal in a solvent is precipitated in a dendrite form and both electrodes are short-circuited finally. Further, in graphite, metal ions can go in and out between layers thereof so that there is no problem of short circuit, but there are problems that it decomposes a propylene carbonate type electrolyte and also charging and discharging cycle characteristics are bad in an ethylene carbonate type electrolyte. On the other hand, use of a carbonaceous material having a multiphase structure has been also studied. This is based on a thought that advantages (high capacity and small irreversible capacity) and disadvantages (decomposition of a propylene carbonate type electrolyte) of a carbonaceous material having high crystallinity and advantages (excellent stability in an electrolyte) and disadvantages (small capacity and large irreversible capacity) of a carbonaceous material having low crystallinity are combined to compensate the disadvantages while maintaining both of the advantages. For example, in Japanese Provisional Patent Publication No. 370662/1992 which the present inventors have proposed previously, there has been disclosed use of carbonaceous material particles which comprise a nucleus comprising a highly graphitized carbonaceous material and a surface layer comprising a lowly graphitized carbonaceous material. However, in said conventional technique, it has been considered that from limitation in preparation, if it is not a relatively thick surface layer, a uniform layer cannot be obtained. Thus, it has been considered that a composite carbonaceous material having a relatively thick surface layer and clearly comprising plural phases is preferred as shown in, for example, an example in which the ratio of a nucleus to a surface layer is 50 parts by weight:50 parts by weight (Example 1), an example of 53:47 (Example 2) and an example of 65:35 (Example 3) as specific examples thereof.

However, the present inventors have studied electrode materials having various physical properties intensively and consequently found that contrary to a conventional technical concept that a composite carbonaceous material having a relatively thick surface layer and clearly comprising plural layers is preferred as a secondary battery electrode material, by using an electrode material in which to a graphite-like carbonaceous material is attached a carbonized material of an organic substance in an extremely minute amount (thin) to give a specific range of a carbon residue, there can be obtained unexpectedly a non-aqueous solvent secondary battery having extremely good electric characteristics such as high electric capacity and lowly suppressed retention and also having high safety to an electrolyte as compared with graphite alone and a conventional composite carbonaceous material clearly comprising plural phases, to accomplish the present invention.

Further, they have found a specific preparation process for obtaining such a specific electrode material and found that by such a method, an electrode material having more uniform characteristics can be prepared stably and efficiently, to complete the present invention.

DISCLOSURE OF THE INVENTION

That is, the essential point of the present invention resides in an electrode material for a non-aqueous solvent secondary battery, which comprises a composite carbonaceous material in which to the surface of a graphite-like (including graphite itself) carbonaceous material is attached a carbonized material of an organic substance in an amount to give a carbon residue of 12 parts by weight or less and 0.1 part by weight or more based on 100 parts by weight of said graphite-like carbonaceous material, or a process for preparing an electrode material for a non-aqueous solvent secondary battery, which comprises the steps of introducing a slurry-state material obtained by adding an aromatic organic solvent to a mixture of graphite-like carbonaceous material particles and an organic substance and adjusting viscosity to 10000 cp or lower into a mixing and stirring apparatus having a reaction room which has a paddle rotatable by a shaft in an inner portion thereof, the inner wall surface of the reaction room being formed substantially along the outermost line of rotation of the paddle and also, being provided a mechanism of deaerating a solvent, heating it to a temperature of the boiling point of the solvent or higher and lower than 600° C. while stirring to prepare a solid-state intermediate and heating said intermediate to 600° C. or higher under inert gas atmosphere to effect carbonization, or a process for preparing an electrode material for a non-aqueous solvent secondary battery, which comprises the steps of introducing a mixture comprising at least graphite-like carbonaceous material particles and an organic substance into a mixing and stirring apparatus having a structure that in an inner portion, a reaction room in which paddles rotatable by plural shafts are provided is equipped, the inner wall surface of the reaction room is formed substantially along the outermost line of rotation of the paddles and the paddles are arranged so that side surfaces facing to each other are engaged, or a mixing and stirring apparatus in an inner portion of which a reaction room in which paddles fixed to a shaft with different phases and rotatable by the shaft are arranged is equipped, the inner wall surface of the reaction room is formed substantially along the outermost line of rotation of the paddles and further a crushing mechanism generating vortex flow by high speed rotation is equipped, heating it to a temperature of 50° C. or higher and lower than 600° C. while stirring by rotating the shaft(s) to prepare an intermediate and heating said intermediate to 600° C. or higher under inert gas atmosphere to effect carbonization.

In the following, the present invention is explained in detail.

The electrode material for a secondary battery of the present invention is a composite carbonaceous material in which a carbonized material of an organic substance is attached to the surface of a graphite-like carbonaceous material.

(1) Selection of starting materials

As the graphite-like carbonaceous material (hereinafter also referred to as the carbonaceous material (N)) which finally forms a nucleus in the present invention, preferred are those having a plane spacing d002 of a (002) plane of 0.345 nm or less, preferably 0.340 nm or less as a peak of a diffraction line corresponding to a structure thereof and also having a crystallite size Lc in the c axis direction of 15 nm or more, preferably 50 nm or more, more preferably a Lc of 80 nm or more. Further, the shape of the graphite-like carbonaceous material may be an optional shape such as a particulate shape, a fibrous shape, etc., but a particulate shape is preferred. As long as a condition that a volume average particle size is 30 $\mu$m or less, preferably 25 $\mu$m or less and 5 $\mu$m or more is satisfied, there can be also used carbonaceous material particles and pitch type, polyacrylonitrile type, mesophase pitch type and gaseous phase growing type carbon fibers processed into powders. These powders may be used singly or by mixing two or more of them.

As a specific preparation process of the carbonaceous material (N), there may be used (a) a method in which a meltable and soluble organic substance, a thermosetting polymer, etc. are heated at a temperature of 1500 to 3000° C., preferably 2000 to 3000° C. under inert gas atmosphere or under vacuum to effect carbonization and graphitization, (b) a method in which a ready-made carbonaceous material such as carbon black, coke, etc. is further subjected to heat treatment to make graphitization proceed moderately, (c) a method in which artificial graphite, natural graphite, graphite whisker grown in gaseous phase or carbon fiber as such or after carrying out adjustments of a particle size and a fiber length is used by processing it into powder, and others.

On the other hand, as a starting material of the carbonized material (hereinafter referred to as the carbonaceous material (S)) of an organic substance, which is finally attached to the surface of the carbonaceous material (N) and almost covers the nucleus, there may be used an organic substance accompanied with a liquid phase carbonization reaction such as heavy oil, etc., an organic substance accompanied with a solid phase carbonization reaction such as a thermosetting resin, etc. or an organic substance such as a mixture of the above materials, etc. (see "Chemistry and Industry of Carbonaceous Material", written by Isao Mochida, published by Asakura Shoten").

As the heavy oil, there may be used coal tar pitches including soft pitch to hard pitch, coal type heavy oil such as coal-liquefied oil, etc., straight-run type heavy oil such as asphaltene, etc., petroleum type heavy oil such as decomposition type heavy oil, etc. including ethylene heavy end tar, etc. by-produced at the time of cracking of crude oil, naphtha, etc., heat-treated pitch obtained by subjecting decomposition type heavy oil to heat treatment such as ethylene tar pitch, FCC decant oil, Kureha pitch, Ashland pitch, etc. or the like.

As the organic substance which makes carbonization proceed in solid phase, there may be mentioned a natural polymer such as cellulose, etc., a thermosetting resin starting material which makes carbonization proceed through a furfuryl alcohol resin, furfuryl alcohol, a phenol-formaldehyde resin, etc. by thermosetting, etc.

(2) Mixing ratio

In the present invention, in general, a mixture of such a graphite-like carbonaceous material particles (N) and the organic substance is heated to obtain an intermediate, and then calcination for carbonization and pulverization are carried out to obtain a composite carbonaceous material in which the carbonized material (S) of the organic substance is finally attached to the surface of the graphite-like carbonaceous material (N). The characteristic feature resides in that the amount of the carbonized material of the organic substance on the surface of the graphite-like carbonaceous material is irreducibly minimum. That is, the carbonized material of the organic substance is attached in an amount to give a carbon residue of 12 parts by weight or less and 0.1 part by weight or more, preferably 8 parts by weight or less and 0.5 part by weight or more, more preferably 7.0 parts by weight or less and 0.65 part by weight or more based on 100 parts by weight of the graphite-like carbonaceous material.

The carbon residue is influenced by the kind of the organic substance and the mixing ratio of the organic substances. The carbon residue rate of the organic substance determined according to the micro method among the test methods defined by JIS K2270 is previously measured, mixing is carried out in consideration of the kind and the mixing amount of the organic substance so that the weight of the carbonized material obtained by multiplication by the weight of the organic substance to be used according to the following (formula 1) is 12 parts by weight or less and 0.1 part by weight or more based on 100 parts by weight of the graphite-like carbonaceous material (N), and the organic substance is adsorbed to the surface of the graphite-like carbonaceous material and said material is impregnated with said substance.

(Formula 1)

$$\text{Carbon residue of organic substance carbonized material based on 100 parts by weight of graphite} = \frac{\text{Carbon residue rate of organic substance (JIS K2270 micro method)} \times \text{Weight of organic substance}}{\text{Weight of graphite}} \times 100$$

In the present invention, if such a carbon residue rate is too small, it is considered that charging of the organic substance into the fine pores of the graphite-like carbonaceous material is insufficient, and there are problems of a. graphite is easily exposed on the surface of the carbonaceous material with a multiphase structure so that stability to an electrolyte is lowered, b. a gas left in the fine pores is blown out in the course of heat treatment so that the multiphase structure might be destroyed and c. if the fine pores are left, they cause worsening of conductivity and inhibition of movement of metal ions, or wettability of the composite carbonaceous material which is an active substance, to an electrolyte is low so that the surface of the carbonaceous material where adsorption and release of metal ions are carried out is not uniformly utilized with respect to delivery and receipt of metal ions. On the other hand, if the carbon residue is too large, it is considered that physical properties of the composite carbonaceous material are worsened by the organic substance in an amount which is larger than the amount of the organic substance charged into the fine pores of the surface of the graphite-like carbonaceous material, whereby bad influences are brought about. Discharging capacity is lowered, charging and discharging efficiency is lowered, and characteristics of the graphite-like carbonaceous material having the theoretical maximum electrode capacity cannot be utilized effectively.

In the preparation process of the present invention, the graphite-like carbonaceous material (N) is mixed with an organic substance, preferably with the organic substance having a viscosity at 50° C. of 200 cp or lower, dispersed in and brought into contact with the organic substance, thereby carrying out an operation that the surfaces and the fine pore insides of the graphite-like carbonaceous material particles are substituted by the organic substance, particularly polycyclic aromatic molecules contained in heavy oil, preferably a polycyclic aromatic oligomer having a larger molecular weight. However, when heavy oil having a viscosity at 50° C. exceeding 200 cp is used, in order to carry out uniform and efficient adsorption of the organic substance to the graphite-like carbonaceous material and impregnation of said material with said substance, it is preferred to add a solvent, for example, an aromatic organic solvent such as toluene, xylene, alkylbenzene, etc. or a solvent comprising a heterocyclic compound such as quinoline, pyridine, etc. to a mixture of the graphite-like carbonaceous material (N) and the organic substance. An aromatic organic solvent is more preferred in the present invention.

Further, in the present invention, it is also useful to previously treat the graphite-like carbonaceous material (N) with a solvent. By dipping the carbonaceous material particles (N) in an aromatic solvent, substituting the surfaces and the fine pore insides by the solvent and then using the carbonaceous material particles which have been separated from the excessive solvent, an effect of improving "wetting" of the carbonaceous material particles (N) to the organic substance can be obtained.

With respect to the ratio of the organic solvent to be added, it is desired to add the organic solvent until a state in which the solvent is added to a mixture of the graphite-like carbonaceous material and the organic substance becomes a slurry state. It is preferably 10000 cp or lower, more preferably 5000 cp or lower, further more preferably 1000 cp or lower in terms of slurry viscosity at 50° C. When the organic substance is a solid, it is necessary to dissolve it by the solvent, and when it is a liquid, it is necessary to adjust viscosity by dilution. When the organic substance is dissolved, it is not necessary that all components of heavy oil are dissolved, but it is sufficient that they are liquefied in a predetermined viscosity range. If the viscosity of heavy oil exceeds 10 Pas (10000 cP), fluctuation in electrode characteristics is caused so that it is not preferred. It is considered that it becomes difficult to charge the organic substance into the fine pores existing in the carbonaceous material (N).

If such charging is insufficient, problems such as the above a, b and c, etc. are liable to be caused.

(3) Preparation process

On the other hand, the preparation process of the present invention for obtaining the composite carbonaceous material of the present invention is explained below.

The preparation process of the composite carbonaceous material of the present invention mainly comprises the following steps.

(A) A step of mixing the carbonaceous material (N) and the organic substance, and preferably a solvent to obtain a mixture.

(B) A step of heating the above mixture at the boiling point of the solvent or higher or 50° C. to lower than 600° C. while stirring to obtain an intermediate.

(C) A step of heating the above intermediate at 600° C. or higher, preferably 2500° C. or lower under inert gas atmosphere to obtain a carbonized substance.

(D) A step of subjecting the above carbonized substance to powdering processing.

A. Mixing step

In the first step of the present invention, the carbonaceous material (N) and the organic substance, and preferably the above-mentioned solvent are added and mixed. The mixing step may be carried out by either a batch type apparatus or a continuous type apparatus. Further, it may be carried out at room temperature or may be carried out by heating a reaction tank. By heating the reaction tank, the viscosity of the mixture can be lowered, load applied to the apparatus can be reduced, and mixing efficiency can be heightened. Further, by making the pressure in the tank at the time of mixing a reduced pressure state, an effect of defoaming from minute powder can be heightened and dispersibility can be improved.

In the case of the batch type, the mixing apparatus may comprise one mixer equipped with a stirring wing or may comprise plural mixers to improve dispersibility gradually. As the batch type mixing apparatus, there may be used a mixer having a structure that two frame-shaped blades rotate in a fixed type tank while performing planetary movement, an apparatus of a type that stirring and dispersing in a tank are carried out by one blade such as a dissolver which is a high speed and high shear mixer and a butterfly mixer for high viscosity, the so-called kneader type apparatus having a structure that a stirring wing having a sigma type or the like rotates along the side surface of a semicylindrical mixing tank, a Tri-mix type apparatus using three stirring wings in total, the so-called bead mill type apparatus having a rotary disc and a dispersion medium in a dispersion tank, etc. The apparatus to be used may be determined by taking the viscosity when the carbonaceous material (N) and the organic substance are mixed into consideration.

On the other hand, when the continuous type apparatus is used, a pipeline mixer may be used, or a continuous type bead mill (a medium-dispersing machine) may be used. Further, there may be used a kneader used for conventional resin processing, etc. in which measures to prevent liquid leakage has been taken. When the mixing apparatus and an apparatus in charge of the next step are different, by using the continuous type mixer, conveyance to the apparatus in charge of the next step can be carried out simultaneously with mixing, whereby the preparation steps can be made more efficient.

Further, by using an external heating type reaction apparatus having a structure that in an inner portion, a reaction room in which one shaft is provided and plural plow-shaped or saw tooth-shaped paddles fixed to the shaft with different phases are arranged in the plural number is equipped, the inner wall surface thereof is formed in a cylindrical shape along the outermost line of rotation of the paddles, gaps therebetween are made minimum and the plural paddles are arranged in the axis direction of the shaft, the mixing step and the step of obtaining the intermediate can be carried out by the same apparatus.

B. Step of obtaining intermediate (devolatilization polycondensation reaction step)

The mixture in which the carbonaceous material (N) is dispersed sufficiently and uniformly and the organic substance is sufficiently charged even into the fine pores of the carbonaceous material (N) in the mixing step is heated while kneading (stirring) in the present step to be recovered as an intermediate product in which the carbonaceous material particles (N) and the organic substance component are highly dispersed and also the organic substance has been subjected to removal of certain volatile components and heat treatment.

Figure 1:
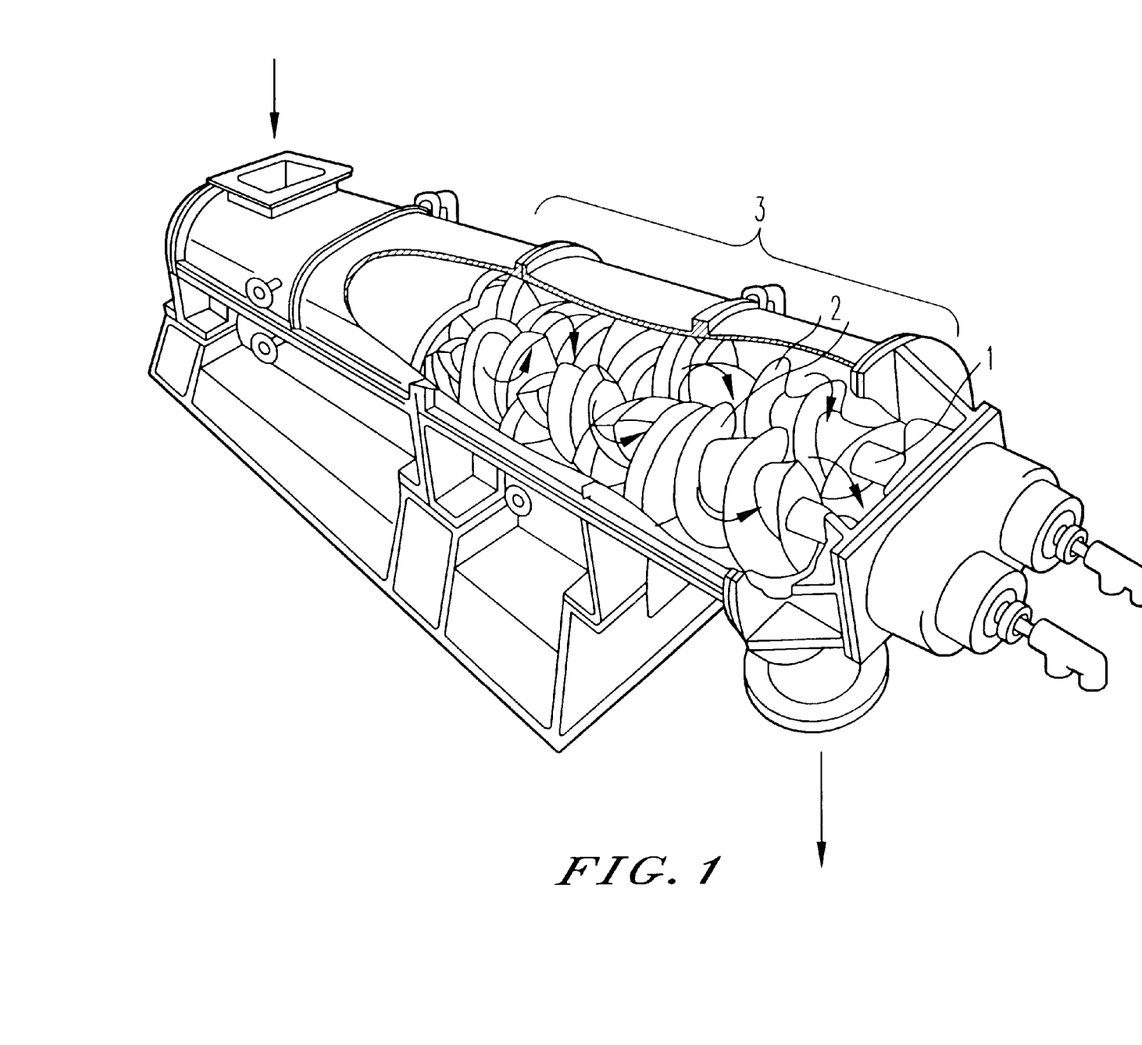
FIG. 1 shows an apparatus used to produce the carbonaceous material of the present invention.
Figure 2A:
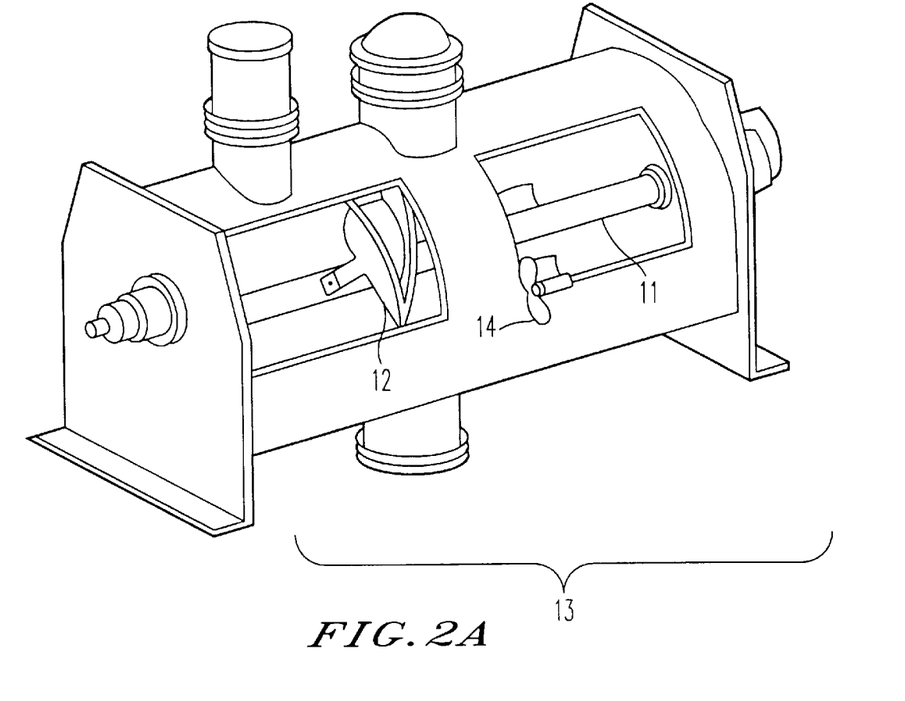
FIGS. 2A and 2B show an alternative apparatus used to produce the present carbonaceous material.
Figure 2B:
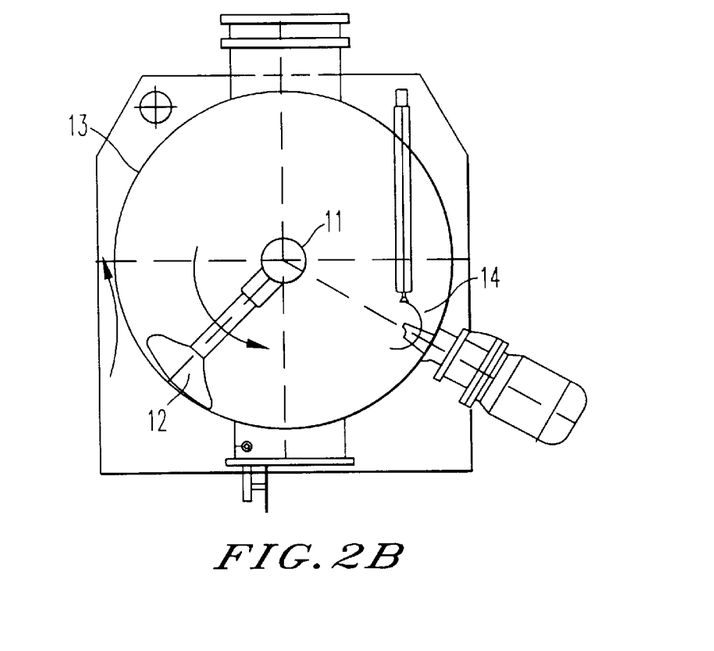

In the present step, it is the most important point that heating is carried out while necessarily stirring. As an apparatus which is fit for the present step, there may be mentioned (a) as shown in FIG. 1, a reactor having a structure that in an inner portion, a reaction room (3) in which paddles (2) rotatable by shafts (1) are provided is equipped, the inner wall surface of the reaction room is formed substantially along the outermost line of rotation of the paddles, preferably in a long twin-hull shape and a large number of pairs of the paddles are arranged in the axis direction of the shafts so that the side surfaces facing to each other are slidably engaged, and (b) as shown in FIGS. 2A and 2B, an (external heating type) reaction apparatus having a structure that in an inner portion, a reaction room (13) in which one shaft (11) is provided and plural plow-shaped or saw tooth-shaped paddles (12) fixed to the shaft with different phases are arranged in the plural number is equipped, the inner wall surface thereof is formed substantially along the outermost line of rotation of the paddles, preferably in a cylindrical shape, gaps therebetween are made minimum and the plural paddles are arranged in the axis direction of the shaft. By using a reaction apparatus having such a structure, there can be obtained a non-aqueous solvent secondary battery negative electrode material with good quality, in which the carbonaceous material (S) is charged even into the fine pore portion of the carbonaceous material particles (N).

As the above (a) type reaction apparatus, there may be mentioned, for example, "KCR Reactor" and "SC Processor" manufactured by Kurimoto Tekkosho K. K., "TEM" manufactured by K. K. Toshiba Kikai Celmack and "TEX-K" manufactured by K. K. Nihon Seikosho. Further, as the (b) type reaction apparatus, there may be mentioned, for example, "Lödige Mixer" manufactured by Gebr der Lödige Maschinenbau, "Proshare Mixer" manufactured by Taiheiyo Kikosha and "DT Dryer" manufactured by Tsukishima Kikai K. K.

Further, in the above (b) type apparatus, it is preferred that one or plural screw-shaped crushing wing(s) which rotate(s) at high speed is/are arranged in one row or a large number of rows on the inner wall surface of the reaction room, whereby prevention of generation of an agglomerate in the mixing operation or a reaction operation subsequent thereto is further ensured, and a more uniform intermediate can be obtained.

By using the reaction apparatus as described above, there are the following advantages:

a) an extremely thin organic substance as the electrode material of the present invention can be attached to the surface of the graphite-like carbonaceous material uniformly and efficiently, b) a heat treatment step until the organic substance is changed to have a sufficiently aromatized structure, which is indispensable for preparation of a carbon material, can be carried out continuously, c) attachment of the organic substance to a reaction tank inner wall can be suppressed by a stirring wing, d) rotation of a crushing wing causes centrifugal vortex flow so that precise mixing of the starting materials can be carried out and also generation of lumps is prevented, whereby the carbonaceous material particles and the organic substance are extremely sufficiently dispersed in the mixing step, stirring can be carried out even after the reaction mixture does not exhibit fluidity in the reaction step, and there can be obtained a product in which the carbonaceous material particles are dispersed uniformly, coating carbons are charged even into the fine pore insides and yet which has been subjected to uniform heat treatment without unevenness depending on the place in the reaction tank, e) particularly when the (b) type reaction apparatus is used, the mixing step and the step of obtaining the intermediate can be carried out simultaneously, and others.

In the present step, the atmosphere in the reaction apparatus is desirably inert atmosphere or non-oxidizing atmosphere, but, under conditions that the intermediate is not accompanied with deterioration due to oxidation, the atmosphere may not be particularly limited. Further, by making the pressure in the reaction tank a reduced pressure state, an effect of defoaming from minute powder can be heightened, dispersibility can be improved and also an effect of removing volatile components from the graphite-like carbonaceous material-organic substance-mixed slurry can be heightened. With respect to the heat treatment temperature in the present step, the optimum condition differs depending on the kind of the organic substance, but it is the boiling point of the solvent or higher, generally in the range of 50° C. to 600° C., preferably in the range of 50° C. to 500° C.

C. Step of obtaining carbonized substance (carbonization step)

The intermediate comprising the carbonaceous material particles (N) and the organic substance which has been sufficiently aromatized (converted into a carbon precursor) obtained by the devolatilization-polycondensation step is heated under flowing of an inert gas such as a nitrogen gas, a carbonic acid gas, an argon gas, etc. in the present step. In the present step, a thermochemical reaction of the carbon precursor proceeds, oxygen, nitrogen and hydrogen remaining in the composition of the precursor are discharged outside the system and also structural defects are removed depending on the degree of the heat treatment, whereby the degree of graphitization is heightened.

As the heat treatment conditions in the present step, a heat history temperature condition is important. Its temperature lower limit differs slightly depending on the kind of the aromatized heavy oil and a heat history thereof, but it is generally 600° C. or higher, preferably 800° C. or higher, more preferably 850° C. or higher. On the other hand, the upper limit temperature can be elevated basically up to a temperature at which a structural order exceeding the crystalline structure of the carbonaceous material (N) is not possessed. Therefore, the upper limit temperature of the heat treatment is generally 2500° C. or lower, preferably 2000° C. or lower, more preferably in the range of 1500° C. or lower. Under such heat treatment conditions, a temperature-elevating rate, a cooling rate, a heat treatment time, etc. can be set optionally depending on the purpose. Further, after the heat treatment is carried out in a relatively low temperature range, the temperature can be elevated to a predetermined temperature.

Further, the reactor to be used in the present step may be a batch type or a continuous type, and one reactor or plural reactors may be used.

D. Powdering processing step

In the present step, the product in which the carbonaceous material (S) has been carbonized and converted into a composite in a state that it covers the partial or entire surface of the carbonaceous material (N) in the carbonization step as described above is subjected to powdering processing treatment such as pulverization, crushing, classification treatment, etc., if necessary, to prepare an electrode material for a non-aqueous solvent secondary battery.

The powdering processing step can be inserted between the devolatilization-polycondensation reaction step and the carbonization step.

(4) Composite carbonaceous material

The composite carbonaceous material of the present invention may have an optional shape such as a particulate shape, a fibrous shape, etc., but a particulate shape is preferred. In the case of a particulate shape, the volume average particle size is 1 to 100 μm, preferably 3 to 30 μm, particularly preferably 5 to 25 μm. In the case of a fibrous shape, the diameter is preferably 0.5 to 25 μm, more preferably 1 to 20 μm, particularly preferably 2 to 10 μm, and the length is preferably 10 mm or less, more preferably 5 mm or less.

Further, it is preferred that the specific surface area of the composite carbonaceous material according to the present invention measured by using the BET method falls within the range of preferably 1 to 10 m$^2$/g, particularly preferably 2 to 6 m$^2$/g, and it is particularly preferred that the BET specific surface area of the produced composite carbonaceous material falls within the range of ⅓ or more and ⅔ or less based on the BET specific surface area of the graphite-like carbonaceous material (N) used as a nucleus.

Further, it is preferred that the composite carbonaceous material of the present invention has the following spectral characteristics in the Raman spectrum analysis using argon ion laser beam with a wavelength of 5145 Å.

In the present invention, the peak intensity and the spectral intensity integrated value are values under the following conditions. That is, the intensity of a peak $P_A$ in a wavelength region of 1580±100 cm$^{-1}$ is defined as $I_A$, the integrated value of spectral intensity in said region is defined as $Y_A$, the intensity of a peak $P_B$ in a wavelength region in the range of 1360±100 cm$^{-1}$ is defined as $I_B$, and the integrated value of spectral intensity in said region is defined as $Y_B$.

It is preferred that in the composite carbonaceous material of the present invention, the ratio of both of the peak intensities $I_B$ to $I_A$, i.e., R=$I_B/I_A$ is larger than the R value of the graphite-like carbonaceous material used as a nucleus of said composite carbonaceous material and is less than 0.4. It is particularly preferably in the range of 0.11 to 0.33, more preferably in the range of 0.12 to 0.28 in order to obtain good electric characteristics. Also, it is preferred that the ratio of the integrated values $Y_B$ to $Y_A$ of spectral intensity, i.e., G=$Y_B/Y_A$ value is larger than the G value of the graphite-like carbonaceous material used as a nucleus of said composite carbonaceous material and is less than 0.75. It is particularly preferably 0.26 to 0.74, more preferably in the range of 0.3 to 0.68.

The R value of an electrode material comprising graphite alone is about 0.1, and the G value is about 0.25. On the other hand, the R value of a conventional composite carbonaceous material having clear plural phases is 0.4 or more, and the G value is about 0.75.

On the other hand, in a diffraction pattern of X-ray wide angle diffraction using CuKα line as a line source, the composite carbonaceous material of the present invention shows a diffraction pattern having a peak derived from the graphite-like carbonaceous material (N) as an apparent single peak and an extremely broad peak derived from the carbonaceous material (S) in a shoulder shape at a low angle side thereof, and there is a great difference in amount ratio between the graphite-like carbonaceous material (N) and the carbonaceous material (S) so that there is a tendency that precise separation of said peaks cannot be carried out by statistical processing. As a particularly preferred embodiment, it is preferred that change in crystalline structure from the graphite-like carbonaceous material used as a nucleus cannot be caught as a X-ray diffraction pattern. That is, when errors in measurement are taken into consideration, it is preferred that it has a half-value width which is substantially equal to that of the graphite-like carbonaceous material which becomes a nucleus. This half-value width is measured from a curve which is smoothed by subjecting X-ray diffraction spectrum to profile fitting by using unsymmetrical Pearson VII function. That is, as a preferred embodiment of the present invention, there may be mentioned use of the composite carbonaceous material in which the half-value width value is within ±3 σ (σ is standard deviation when measurement is carried out 10 times) of the half-value width value of the graphite-like carbonaceous material (N) used as a nucleus thereof.

That is, the half-value width of the composite carbonaceous material of the present invention can be suppressed to a range equal to the half-value width of the graphite-like carbonaceous material (N) to be used as a nucleus. In comparison therewith, it can be confirmed that in a conventional composite carbonaceous material having a thick surface layer, the half-value width is increased. These phenomena, i.e., increase in half-value width can be interpreted as increase in distortion generated in graphite. Therefore, it can be considered that in the present invention, the structure of graphite is maintained so that high capacity equal to that of graphite can be retained, while in a conventional composite carbonaceous material, distortion is generated in the graphite structure so that lowering in capacity is caused.

(5) Secondary battery

The above composite carbonaceous material can be used as a negative electrode by making it an electrode material comprising a mixture with a high molecular weight binder or a mixture in which a metal which can form an alloy with an active substance or an alloy of an active substance and said metal is formulated, according to a known method and molding said electrode material as such into a shape of an electrode by a method such as roll molding, compression molding, etc. As the constitution of the secondary battery of the present invention, there may be employed a negative electrode obtained as described above, a known optional positive electrode and a known optional separator which intervenes between said positive electrode and the negative electrode and holds an electrolyte, for example, nonwoven fabric of a polyolefin type resin such as a polyethylene and a polypropylene. Further, as an electrolyte with which this is to be impregnated, there may be used a known optional electrolyte, for example, a non-aqueous electrolyte having a predetermined concentration in which an electrolyte such as $LiClO_4$, $LiBF_4$, $LiAsF_6$, $LiPF_6$, $LiSO_3CF_3$, $LiN(SO_2CF_3)_2$, etc. is dissolved in an aprotic organic solvent such as ethylene carbonate, propylene carbonate, 1,3-dioxolan, 1,2-dimethoxyethane, 2-methyltetrahydrofuran, etc.

Best mode for practicing the invention

Next, the present invention is explained in more detail by referring to Examples, but the present invention is not limited by these Examples.

EXAMPLE 1

(1) Mixing step

Into a stainless steel tank having an inner volume of 20 liters was thrown 3 kg of artificial graphite powder (KS-44 produced by LONZA Co.: d002=0.336 nm, Lc=100 nm or more, average volume particle size of 19 µm) as the carbonaceous material (N), to the powder were added 1 kg of ethylene heavy end tar (produced by Mitsubishi Chemical Corporation: viscosity at 50° C. of 50 cp) which can be obtained at the time of naphtha decomposition as the carbonaceous material (S) and further 3.5 kg of hard alkylbenzene (produced by Mitsubishi Chemical Corporation) as a diluent, and the mixture was stirred by a hand mixer for 20 minutes. Further, when the stainless steel vessel was dipped in hot water bath with hot water at 80° C. and the mixture was further stirred by the same means for 10 minutes, it was confirmed even visually from the fluidity of the prepared slurry that a mixing degree was improved. The viscosity of the obtained slurry was 3210 cp.

(2) Devolatilization·polycondensation reaction step

By using a metering gear pump, the mixture in a slurry state obtained in the mixing step was fed into the (a) type apparatus an outline of which is shown in FIG. 1, explained in the above specification, i.e., one KRCS1 reactor manufactured by Kurimoto Tekkosho K. K. at 3.2 Kg/h to effect a reaction of converting ethylene heavy end tar into pitch by heat treatment. By keeping a reactor inner temperature at 430° C. and further setting a reduced pressure degree to $87.99 \times 10^3$ Pa (660 torr), deaeration and devolatilization were effected, and the light fraction of ethylene heavy end tar and the diluent were removed. The resulting product was recovered in a pellet state from the KRC reactor outlet at 1.5 Kg/h. Thus, a composite of the carbonaceous material particles and the heat-treated pitch was obtained. In the KCR reactor used in the reaction, convex lens-shaped paddles having a diameter of 25 mm in the total number of 15 paddles were furnished with the angles being shifted by 45 degrees and used.

(3) Carbonization step

The above composite granules of the carbonaceous material particles and the sufficiently aromatized pitch were subjected to heat treatment by a batch type heating furnace. The composite granules placed in a graphite container was put into an internal heating type heating furnace, and the temperature was elevated to 950° C. over 3 hours under a nitrogen gas flow amount of 5 liter/min and maintained for 1 hour. Thereafter, it was cooled to room temperature to obtain a composite in which coated phase was carbonized.

(4) Powdering processing step

The composite obtained in the carbonization step was crushed by using an impact type pulverizer to obtain carbon type composite powder having a certain particle size distribution. The carbonized material amount of the organic substance based on 100 parts by weight of graphite is shown in a table.

(5) Analysis of carbon type composite powder

According to the following means, analysis was carried out. The results are shown in Table 1.

(5-1) Plane spacing (d002) of (002) plane and crystallite size Lc

The carbonaceous material as such when it was powder, or powdered by an agate mortar when it was fine flake was mixed with high purity silicone powder for X-ray standard in an amount of about 15 wt % based on a sample, and the mixture was filled in a sample cell. The wide angle X-ray diffraction curve was measured by the reflection system diffractometer method with CuKα line monochromated by a graphite monochrometer as a line source. The resulting X-ray diffraction curve showed a shape in which two peaks derived from different crystallinities were overlapped, and there appeared a peak derived from the graphite-like carbonaceous material as an apparent single peak and an extremely broad peak derived from the carbonaceous material-coated layer in a shoulder shape at a low angle side thereof. However, there was a great difference in amount ratio between the graphite-like carbonaceous material and the carbonaceous material attached to the surface of the composite carbonaceous material so that precise separation of the peaks could not be carried out by statistical processing.

(5-2) Raman spectrum analysis

In the Raman spectrum analysis using argon ion laser beam with a wavelength of 514.5 nm, the intensity IA of a peak PA in the vicinity of 1580 $cm^{-1}$ and the intensity IB of a peak PB in the range of 1360 $cm^{-1}$ were measured, and an intensity ratio thereof R=IB/IA was measured. The graphite KS-44R value was 0.12, and it was judged that the surface was coated.

(5-3) Volume standard average particle size

By using a laser diffraction type particle size distribution meter "LA-700" manufactured by Horiba Seisakusho Co., a volume standard average particle size (a median size) was measured by using ethanol as a dispersion medium.

(6) Evaluation of electrode characteristics (6-1) Preparation of electrode

A toluene solution of a thermoplastic elastomer (a styrene ethylene-butylene styrene-block copolymer) and polyethylene powder were added and stirred to obtain a slurry. The weight ratio was 93 wt % of the carbonaceous material, 4 wt % of the thermoplastic elastomer (a solid component) and 3 wt % of the polyethylene powder. This slurry was coated on a copper foil, and predrying was carried out at 80° C. Further, it was adhered to the copper foil by pressurization and then punched out in a disc shape having a diameter of 20 mm, followed by drying under reduced pressure at 110° C., to prepare an electrode.

(6-2) Evaluation of wetting

In order to compare the degree of wetting with an electrolyte, measurement of the contact angle of the electrode prepared in (6-1) was carried out by using a goniometer type contact angle measurement device. In the measurement, propylene carbonate having a purity of 99.9% was used as a single solvent. As a result, measurement could not be carried out because the contact angle was small. This shows that affinity of the solvent with the electrode is extremely good. The reason why propylene carbonate was used is that ethylene carbonate alone is a solid at room temperature, and in order to liquefy ethylene carbonate, other component should be mixed as a secondary solvent, whereby experiment conditions cannot be simplified. In comparison of the contact angle, experiment conditions should be as simple as possible so that propylene carbonate which is a liquid at room temperature was selected.

(6-3) Evaluation of electrode by half cell

There was prepared a coin-shaped cell in which the above electrode was opposed to a lithium metal electrode through a separator impregnated with an electrolyte, and a charging and discharging test was carried out. As the electrolyte, there was used an electrolyte in which lithium perchlorate was dissolved at a ratio of 1.5 mole/liter in a solvent in which ethylene carbonate and diethylene carbonate were mixed at a weight ratio of 1:1.

In the charging and discharging test, the current value was made 0.2 mA, charging was carried out until the electric potential difference between both electrodes became 0 V, and discharging was carried out until it became 1.5 V. The results are shown in Table 2. The irreversible capacity in the table is a value obtained by deducting the value of discharging capacity from charging capacity, and the charging and discharging efficiency is a value obtained by dividing discharging capacity by charging capacity.

EXAMPLE 2

Figure 3:
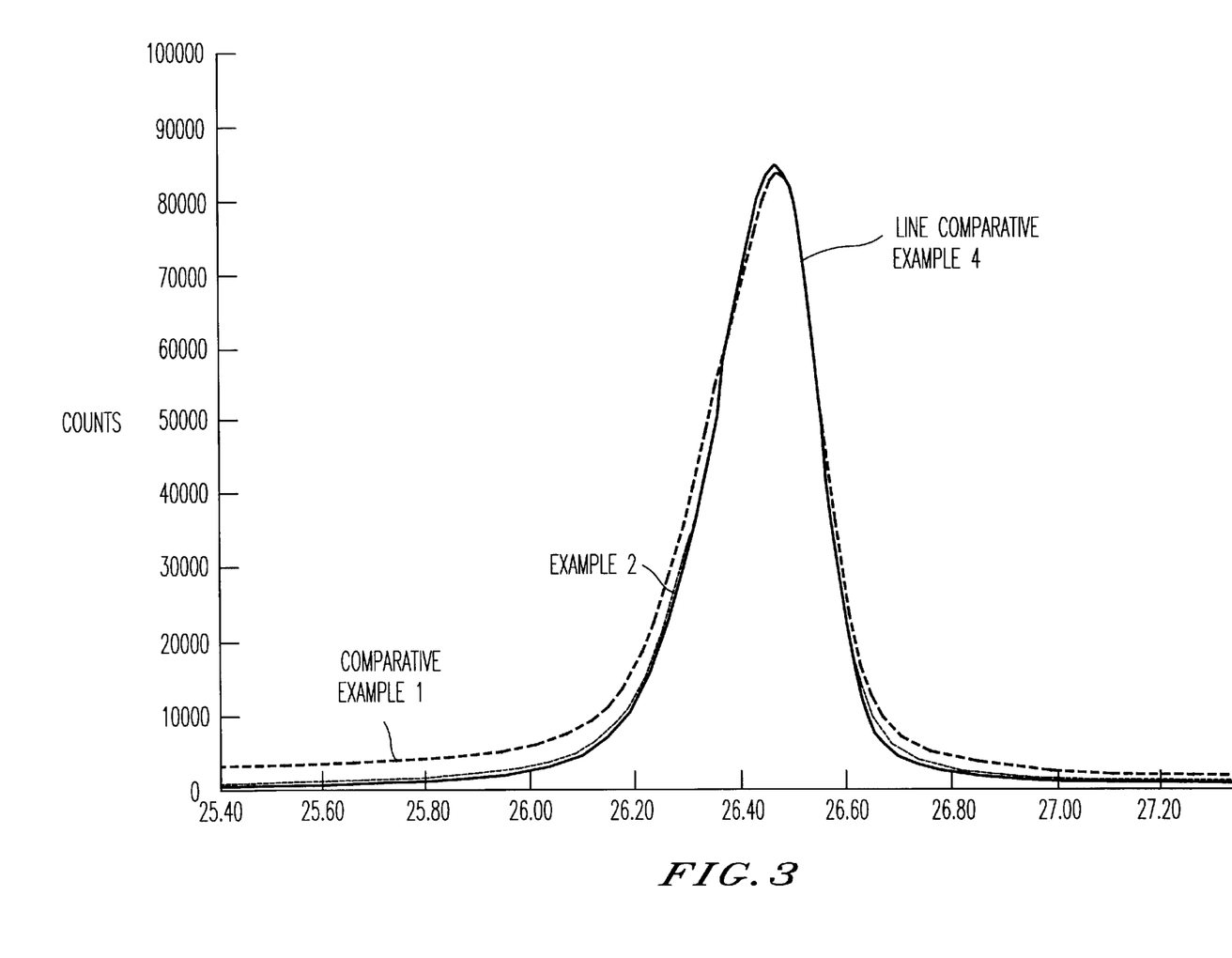
FIG. 3 shows an X-ray diffraction spectrum of the present carbonaceous material.

The same procedures as in Example 1 were carried out except for setting the highest treatment temperature in the carbonization step at 1200° C. The result that the X-ray diffraction spectrum pattern of this composite carbonaceous material is subjected to smoothing is shown in FIG. 3. From this graph, it was found that the half-value width was 0.223°. The half-value width of the X-ray diffraction spectrum of a graphite-like carbonaceous material which became a nucleus shown in Comparative example 4 described below is 0.216° and the standard deviation $\sigma$ of the half-value width is $3.12 \times 10^{-3°}$ so that it can be confirmed that the half-value width of the composite carbonaceous material of Example 2 is within the range of $\pm 3 \sigma$ of the half-value width of the graphite-like carbonaceous material used as a nucleus.

EXAMPLE 3

The same procedures as in Example 1 were carried out except for setting the highest treatment temperature in the carbonization step at 2000° C.

EXAMPLE 4

The same procedures as in Example 1 were carried out except or setting the highest treatment temperature in the carbonization step at 2400° C.

EXAMPLE 5

(1) Mixing step

By using the apparatus an outline of which is shown in FIG. 2, described as the (b) type in the above specification, i.e., a Lödige mixer M-20 Model manufactured by Gebr der Lödige Maschinenbau (inner volume of 20 liters), a mixing step and a devolatilization step were carried out. First, from a starting material-feeding inlet, 3 Kg of artificial graphite powder (KS-25 produced by LONZA Co.), 1 Kg of ethylene heavy end tar (produced by Mitsubishi Chemical Corporation: viscosity at 50° C. of 50 cp)) and further 2.8 kg of toluene as a diluent were thrown, and operation was started. With respect to the operation conditions, the rotational number of a plow-shaped stirring wing was 200 rpm, the rotational number of a crushing wing was 2000 rpm, and the temperature in the apparatus was room temperature. This operation was carried out for 10 minutes.

(2) Devolatilization step

Hot water was flown into a jacket of the mixer, and heating was carried out at 100° C. Next, the pressure in the inner portion of the apparatus was gradually reduced to $13.33 \times 10^3$ Pa (100 torr) finally, whereby deaeration and devolatilization were made to proceed, and the light fraction of ethylene heavy end tar and the diluent were removed. Thereafter, the temperature was lowered to room temperature to obtain a composite as powder, in which ethylene heavy end tar was attached to artificial graphite powder and said powder was impregnated with said tar.

(3) Carbonization step and Powdering processing step

The same procedures as in Example 1 were carried out except for setting the highest treatment temperature in the carbonization step at 1200° C.

(4) Analysis-evaluation of carbon type composite powder

They were carried out in the same manner as in Example 1.

The evaluation results are shown in Tables 1 and 2.

EXAMPLE 6

In the same manner as in Example 5, a mixing step and a devolatilization step were carried out by using a Lödige mixer M-20 Model manufactured by Gebr der Lödige Maschinenbau (inner volume of 20 liters). First, from a starting material-feeding inlet, 3 Kg of artificial graphite powder (KS-44 produced by LONZA Co.), 0.6 Kg of ethylene heavy end tar (produced by Mitsubishi Chemical Corporation: viscosity at 50° C. of 50 cp)) and further 3.0 kg of toluene as a diluent were thrown. As subsequent procedures, the same procedures as in Example 1 were carried out.

EXAMPLE 7

In the same manner as in Example 5, a mixing step and a devolatilization step were carried out by using a Lödige mixer M-20 Model manufactured by Gebr der Lödige maschinenbau (inner volume of 20 liters). First, from a starting material-feeding inlet, 3 Kg of artificial graphite powder (KS-44 produced by LONZA Co.), 0.6 Kg of ethylene heavy end tar (produced by Mitsubishi Chemical Corporation: viscosity at 50° C. of 50 cp)) and further 3.0 kg of toluene as a diluent were thrown. As subsequent procedures, the same procedures as in Example 1 were carried out except for setting the highest treatment temperature in the carbonization step at 1200° C.

EXAMPLE 8

In the same manner as in Example 5, a mixing step and a devolatilization step were carried out by using a Lödige mixer M-20 Model manufactured by Gebr der Lödige Maschinenbau (inner volume of 20 liters). First, from a starting material-feeding inlet, 3 Kg of artificial graphite powder (KS-44 produced by LONZA Co.), 0.2 Kg of ethylene heavy end tar (produced by Mitsubishi Chemical Corporation: viscosity at 50° C. of 50 cp)) and further 3.2 kg of toluene as a diluent were thrown. As subsequent procedures, the same procedures as in Example 1 were carried out.

EXAMPLE 9

In the same manner as in Example 5, a mixing step and a devolatilization step were carried out by using a Lödige mixer M-20 Model manufactured by Gebr der Lödige Maschinenbau (inner volume of 20 liters). First, from a starting material-feeding inlet, 3 Kg of artificial graphite powder (KS-44 produced by LONZA Co.), 0.2 Kg of ethylene heavy end tar (produced by Mitsubishi Chemical Corporation: viscosity at 50° C. of 50 cp)) and further 3.2 kg of toluene as a diluent were thrown. As subsequent procedures, the same procedures as in Example 1 were carried out except for setting the highest treatment temperature in the carbonization step at 1200° C.

EXAMPLE 10

(1) Mixing step

In the same manner as in Example 5, a mixing step and a devolatilization step were carried out by using a Lödige mixer M-20 Model manufactured by Gebr der Lödige Maschinenbau (inner volume of 20 liters).

First, from a starting material-feeding inlet, 3 kg of artificial graphite powder (KS-44 produced by LONZA Co.), 0.27 kg of coal tar pitch (produced by Shin-nihon Tetsu Kagaku Co.) and 3.0 kg of pyridine as a diluent were thrown. As subsequent procedures, the same procedures as in Example 1 were carried out.

(2) Devolatilization-polycondensation reaction step

Next, the inner portion was substituted by nitrogen gas atmosphere, and temperature elevation was started. The inner temperature was elevated to 110° C. over 80 minutes, and further mixing for 90 minutes was carried out. Thereafter, the pressure in the inner portion was gradually reduced to $30.66 \times 10^3$ Pa (230 torr) finally, which required 30 minutes. After the solvent was thus recovered, the inner temperature was lowered gradually, and the content was recovered in a powder state from a discharging outlet. Thus, there was obtained a composite in which the coal tar pitch component was attached to the graphite powder and said powder was impregnated with said component.

As subsequent procedures, the same procedures as in Example 1 were carried out except for setting the highest treatment temperature in the carbonization step at 1200° C.

EXAMPLE 11

As an organic substance which became the carbonaceous material (S) finally, FCC decant oil was used as decomposition type petroleum pitch and a sample was prepared by the same means as in Example 1.

First, into a stainless steel tank having an inner volume of 20 liters was thrown 3 Kg of artificial graphite powder (KS-25 produced by LONZA Co.: $d002=0.336$ nm, $Lc=100$ nm or more, average volume particle size of 10 μm) as the carbonaceous material (N), to the powder were added 1 kg of FCC decant oil as a starting material of the carbonaceous material (S) and further hard alkylbenzene as a diluent, and the mixture was stirred by a hand mixer for 20 minutes. Further, the stainless steel vessel was subjected to hot water bath by hot water at 80° C., and the mixture was further stirred by the same means for 10 minutes.

Subsequently, carbon type composite powder was obtained by the same method. Analysis-electrode evaluation was also carried out according to the same means as in other Examples.

EXAMPLE 12

(1) Mixing step

Into a stainless steel tank having an inner volume of 20 liters was thrown 3 kg of artificial graphite powder (KS-44 produced by LONZA Co.: $d002=0.336$ nm, $Lc=100$ nm or more, average volume particle size of 19 μm) as the carbonaceous material (N), to the powder were added 1 kg of ethylene heavy end tar (produced by Mitsubishi Chemical Corporation: viscosity at 50° C. of 50 cp) obtained as the carbonaceous material (S) at the time of naphtha decomposition and further 3.0 kg of toluene as a diluent, and the mixture was stirred by a hand mixer for 20 minutes. Further, when the stainless steel vessel was subjected to hot water bath by hot water at 80° C. and the mixture was further stirred by the same means for 10 minutes, it was confirmed even visually from the fluidity of the prepared slurry that a mixing degree was improved. The viscosity of the obtained slurry was 3500 cp.

(2) Devolatilization-polycondensation reaction step

By using a slurry pump for high viscosity, the mixture in a slurry state obtained in the mixing step was fed into one SC processor SCP-100 Model manufactured by Kurimoto Tekkosho Co. at 75 Kg/h to effect a distillation reaction of ethylene heavy end tar and toluene. By keeping a reactor inner temperature at 190° C. and further setting a reduced pressure degree to $87.99 \times 10^3$ Pa (660 torr), deaeration and devolatilization were effected, and the light fraction of ethylene heavy end tar and the diluent were removed. The resulting product was recovered in a pellet state from the KRC reactor outlet at 36 Kg/h. Thus, a composite of the carbonaceous material particles and the residue of ethylene heavy end tar was obtained.

As subsequent procedures, the same procedures as in Example 1 were carried out except for setting the highest treatment temperature in the carbonization step at 1200° C.

Comparative Example 1

By the same means as in the case of Example 1, composite carbonaceous material powder in which the amount of an organic substance attached to a graphite-like carbonaceous material was extremely excessive was prepared, and evaluation was carried out.

First, into a stainless steel tank having an inner volume of 20 liters was thrown 3 Kg of artificial graphite powder (KS-44 produced by LONZA Co.: $d002=0.336$ nm, $Lc=100$ nm or more, average volume particle size of 19 μm) as the carbonaceous material (N), to the powder was added 7 Kg of ethylene heavy end tar (produced by Mitsubishi Chemical Corporation: viscosity at 50° C. of 50 cp) obtained as a starting material of the carbonaceous material (S) at the time of naphtha decomposition, and the mixture was stirred by a hand mixer for 20 minutes. Further, the stainless steel vessel was subjected to hot water bath by hot water at 80° C., and the mixture was further stirred by the same means for 10 minutes.

(2) Devolatilization-polycondensation reaction step

By using a metering gear pump, the mixture in a slurry state obtained in the mixing step was fed into one KRCS1 reactor manufactured by Kurimoto Tekkosho Co. at 3.1 Kg/h to effect a reaction of converting ethylene heavy end tar into pitch by heat treatment. By keeping a reactor inner temperature at 430° C. and further setting a reduced pressure degree to $87.99 \times 10^3$ Pa (660 torr), deaeration and devolatilization were effected, and the light fraction of ethylene heavy end tar was removed. The resulting product which was a semi-solid solution showing high viscosity was recovered in a pellet state from the KRC reactor outlet at 1.5 Kg/h. Thus, a composite of the carbonaceous material particles and the heat-treated pitch was obtained. In the KCR reactor used in the reaction, convex lens-shaped paddles having a diameter of 25 mm in the total number of 15 paddles were furnished with the angles being shifted by 45 degrees and used.

As subsequent procedures, the same procedures as in Example 1 were carried out except for setting the highest treatment temperature in the carbonization step at 1200° C.

The result that the X-ray diffraction spectrum pattern of this composite carbonaceous material is subjected to smoothing is shown in FIG. 3. From this graph, it was found that the half-value width of the composite carbonaceous material of Comparative example 1 was 0.230°. The half-value width of the X-ray diffraction spectrum of a graphite-like carbonaceous material which became a nucleus shown in Comparative example 4 described below is 0.216° and the standard deviation σ of the half-value width is $3.12 \times 10^{-3°}$ so that it can be confirmed that the half-value width of the composite carbonaceous material of Comparative example 1 is outside the range of $\pm 3$ σ of the half-value width of the graphite-like carbonaceous material used as a nucleus.

Comparative Example 2

First, into a stainless steel tank having an inner volume of 20 liters was thrown 3 Kg of artificial graphite powder (KS-44 produced by LONZA Co.: d002=0.336 nm, Lc=100 nm or more, average volume particle size of 19 μm) as the carbonaceous material (N), to the powder were added 4.2 Kg of ethylene heavy end tar (produced by Mitsubishi Chemical Corporation: viscosity at 50° C. of 50 cp) which can be obtained at the time of naphtha decomposition as a starting material of the carbonaceous material (S) and further 3.0 Kg of hard alkylbenzene as a diluent, and the mixture was stirred by a hand mixer for 20 minutes. Further, the stainless steel vessel was dipped in hot water bath with hot water at 80° C., and the mixture was further stirred by the same means for 10 minutes. As subsequent procedures, the same procedures as in Example 1 were carried out except for setting the highest treatment temperature in the carbonization step at 1200° C.

Comparative Example 3

By the same means as in the case of Example 5, composite carbonaceous material powder in which the amount of an organic substance attached to a graphite-like carbonaceous material was extremely excessive was prepared, and evaluation was carried out.

(1) Mixing step

First, from a starting material-feeding inlet, 3 kg of artificial graphite powder (KS-44 produced by LONZA Co.), 1.6 kg of coal tar pitch (produced by Shin-nihon Tetsu Kagaku Co.) and 3 kg of pyridine as a diluent were thrown, and operation was started. With respect to the operation conditions, the rotational number of a plow-shaped stirring wing was 230 rpm, the rotational number of a crushing wing was 3000 rpm, and the temperature in the apparatus was 30° C.

(2) Devolatilization.polycondensation reaction step

Next, the inner portion was substituted by nitrogen gas atmosphere, and temperature elevation was started. The inner temperature was elevated to 110° C. over 80 minutes, and further mixing for 90 minutes was carried out. Thereafter, the pressure in the inner portion was gradually reduced to $30.66 \times 10^3$ Pa (230 torr) finally, which required 40 minutes. After the solvent was thus recovered, the inner temperature was lowered gradually, and the content was recovered in a granulated state from a discharging outlet. A composite of graphite powder and coal tar pitch was obtained as an almost uniform granulate having a diameter of about 2 mm.

As subsequent procedures, the same procedures as in Example 1 were carried out except for setting the highest treatment temperature in the carbonization step at 1200° C.

Comparative Example 4

A comparative experiment was carried out by using artificial graphite KS-44 produced by LONZA Co. as artificial graphite powder which was not subjected to surface modification. The result that the X-ray diffraction spectrum pattern of this graphite is subjected to smoothing is shown in FIG. 3. From this graph, it was found that the half-value width of graphite of Comparative example 4 was 0.216°. The standard deviation G of the half-value width is $3.12 \times 10^{-3°}$.

Comparative Example 5

A comparative experiment was carried out by using artificial graphite KS-25 produced by LONZA Co. as artificial graphite powder which was not subjected to surface modification.

Comparative Example 6

A comparative experiment was carried out by using natural graphite NG-7 produced by Kansai Netsukagakusha as artificial graphite powder which was not subjected to surface modification.

TABLE 1

| | | Carbonaceous material (N) Kind of nucleus | Carbonaceous material (S) Kind of organic substance | Calcining temperature | Carbon residue rate of organic substance | Carbon residue rate based on 100 parts by weight of graphite | BET specific surface area $m^2/g$ | Raman spectrum R value | Raman spectrum G value |
|---|---|---|---|---|---|---|---|---|---|
| Example | 1 | KS44 | Ethylene heavy end | 950 | 11 | 3.66 | 3.74 | 0.31 | 0.73 |
| | 2 | " | Ethylene heavy end | 1200 | 11 | 3.66 | 4.7 | 0.21 | 0.52 |
| | 3 | " | Ethylene heavy end | 2000 | 11 | 3.66 | 4.31 | 0.27 | 0.32 |
| | 4 | " | Ethylene heavy end | 2400 | 11 | 3.66 | 4.11 | 0.11 | 0.27 |
| | 5 | KS25 | Ethylene heavy end | 1200 | 11 | 3.66 | 4.19 | 0.22 | 0.53 |
| | 6 | KS44 | Ethylene heavy end | 950 | 11 | 2.2 | 4.05 | 0.27 | 0.65 |
| | 7 | " | Ethylene heavy end | 1200 | 11 | 2.2 | 3.77 | 0.18 | 0.44 |
| | 8 | " | Ethylene | 950 | 11 | 0.732 | 4.74 | 0.27 | 0.65 |

TABLE 1-continued

|  |  | Carbonaceous material (N) Kind of nucleus | Carbonaceous material (S) Kind of organic substance | Calcining temperature | Carbon residue rate of organic substance | Carbon residue rate based on 100 parts by weight of graphite | BET specific surface area m²/g | Raman spectrum R value | Raman spectrum G value |
|---|---|---|---|---|---|---|---|---|---|
|  | 9 | " | Ethylene heavy end | 1200 | 11 | 0.732 | 4.86 | 0.13 | 0.33 |
|  | 10 | " | Ethylene heavy end | 1200 | 60 | 5.4 | 4.16 | 0.21 | 0.56 |
|  | 11 | " | Coal tar pitch | 1200 | 2.1 | 2.2 | 3.75 | 0.22 | 0.45 |
|  | 12 | " | FCC decant | 1200 | 11 | 3.66 | 4.15 | 0.23 | 0.52 |
| Comparative example | 1 | KS44 | Ethylene heavy end | 1200 | 11 | 25.6 | 5.4 | 0.35 | 0.71 |
|  | 2 | " | Ethylene heavy end | 1200 | 11 | 15.4 | 4.28 | 0.37 | 0.75 |
|  | 3 | " | Coal tar pitch | 1200 | 60 | 32 | 4.34 | 0.37 | 0.74 |
|  | 4 | " | None | Not baked | 0 | 0 | 9.61 | 0.12 | 0.27 |
|  | 5 | KS25 | None | Not baked | 0 | 0 | 10.42 | 0.12 | 0.28 |
|  | 6 | NG7 | None | Not baked | 0 | 0 | 7.03 | 0.1 | 0.25 |

TABLE 2

|  |  | Contact angle (°) | Discharging capacity (mAh/g) | Irreversible capacity (mAh/g) | Charging and discharging efficiency |
|---|---|---|---|---|---|
| Example | 1 | 0 | 370 | 73 | 0.84 |
|  | 2 | 0 | 370 | 40 | 0.9 |
|  | 3 | 0 | 369 | 37 | 0.91 |
|  | 4 | 0 | 336 | 32 | 0.91 |
|  | 5 | 0 | 370 | 35 | 0.91 |
|  | 6 | 0 | 370 | 46 | 0.89 |
|  | 7 | 0 | 369 | 25 | 0.94 |
|  | 8 | 0 | 362 | 15 | 0.96 |
|  | 9 | 0 | 363 | 8 | 0.98 |
|  | 10 | 0 | 368 | 40 | 0.9 |
|  | 11 | 0 | 365 | 35 | 0.91 |
|  | 12 | 0 | 370 | 38 | 0.91 |
| Comparative example | 1 | 0 | 304 | 50 | 0.86 |
|  | 2 | 0 | 323 | 40 | 0.89 |
|  | 3 | 0 | 315 | 55 | 0.85 |
|  | 4 | 26 | 362 | 62 | 0.85 |
|  | 5 | 30 | 370 | 63 | 0.85 |
|  | 6 | 32 | 368 | 63 | 0.85 |

Utilizability in industry

As explained above, according to the non-aqueous solvent secondary battery electrode material of the present invention, there can be provided a non-aqueous solvent secondary battery in which good electric characteristics that while maintaining discharging capacity which is as high as graphite. irreversible capacity can be suppressed to extremely low and charging efficiency is excellent can be obtained and further stability to an electrolyte is improved.

Also, according to the preparation process of the present invention, a composite carbonaceous material having such high characteristics and uniform characteristics can be prepared stably with good efficiency.

We claim:

1. A non-aqueous solvent secondary battery which comprises a positive electrode, a negative electrode and an electrolyte in which an electrolyte is dissolved in a non-aqueous solvent, wherein a composite carbonaceous material in which to the surface of a carbonaceous material is attached a carbonized material of an organic substance in an amount to give a carbon residue of 12 parts by weight or less to 0.1 part by weight or more based on 100 parts by weight of said carbonaceous material is used as a material of the negative electrode, wherein a Raman spectrum analysis of said electrode material at the 5145Å line of an argon ion laser beam shows a peak $P_A$ in a range of $1580\pm100$ cm$^{-1}$ and a peak $P_B$ in a range of $1360\pm100$ cm$^{-1}$, and a ratio (R) of an intensity $I_B$ of said peak $P_B$ to an intensity $I_A$ of said peak $P_A$, $R=I_B/I_A$, is higher for said electrode material than for said carbonaceous material, and said ratio is less than 0.4 for said electrode material, and said carbonaceous material has a plane spacing d002 of a (002) plane of 0.345 nm or less.

2. The electrode material of claim 1, wherein said ratio (R) is 0.11 to 0.33 for said electrode material.

3. The electrode material of claim 1, wherein said ratio (R) is 0.12 to 0.28 for said electrode material.

4. The electrode material of claim 1, wherein said carbonaceous material has a plane spacing d002 of a (002) plane of 0.340 nm or less.

5. The electrode material of claim 1, wherein said carbonaceous material has a crystallite size Lc in the c axis direction of 15 nm or more.

6. An electrode material for a non-aqueous solvent secondary battery comprising:

a nucleus comprising a carbonaceous material; and a surface layer attached to said nucleus, wherein said surface layer comprises a carbonized material of an organic substance in an amount to give a carbon residue of 0.1 to 12 parts by weight based on 100 parts by weight of said nucleus;

a Raman spectrum analysis of said electrode material at the 5145Å line of an argon ion laser beam shows a peak $P_A$ in a range of $1580\pm100$ cm$^{-1}$ and a peak $P_B$ in a range of $1360\pm100$ cm$^{-1}$, and a ratio (R) of an intensity $I_B$ of said peak $P_B$ to an intensity $I_A$ of said peak $P_A$, $R=I_B/I_A$, is higher for said electrode material than for said carbonaceous material, and said ratio is less than 0.4 for said electrode material, and said carbonaceous material has a plane spacing d002 of a (002) plane of 0.345 nm or less.

7. The non-aqueous solvent secondary battery electrode material according to claim 6, wherein the ratio of an integrated value $Y_B$ of spectral intensity in the range of $1360\pm100$ cm$^{-1}$ to an integrated value $Y_A$ of spectral intensity in the range of $1580\pm100$ cm$^{-1}$, $G=Y_B/Y_A$ in the Raman spectrum analysis of said composite carbonaceous material is larger than the G value of the carbonaceous material used in said composite carbonaceous material and is less than 0.75.

8. The non-aqueous solvent secondary battery electrode material according to claim 6, wherein the half-value width in the X-ray diffraction pattern of said composite carbonaceous material is within $\pm 3$ $\sigma$ ($\sigma$ is standard deviation) of the half-value width in the X-ray diffraction pattern of the carbonaceous material to be used as a nucleus thereof.

9. The electrode material of claim 6, wherein said ratio (R) is 0.11 to 0.33 for said electrode material.

10. The electrode material of claim 6, wherein said ratio (R) is 0.12 to 0.28 for said electrode material.

11. The electrode material of claim 6, wherein said carbonaceous material has a plane spacing d002 of a (002) plane of 0.340 nm or less.

12. The electrode material of claim 6, wherein said carbonaceous material has a crystallite size Lc in the c axis direction of 15 nm or more.

13. A process for preparing an electrode material for a non-aqueous solvent secondary battery, which comprises:

introducing a slurry material obtained by adding an aromatic organic solvent to a mixture of a carbonaceous material particles and an organic substance and adjusting viscosity to 10000 cp or lower into a mixing and stirring apparatus having a reaction room which has a paddle rotatable by a shaft in an inner portion thereof, the inner wall surface of the reaction room being formed substantially along the outermost line of rotation of the paddle and also, being provided a mechanism of deaerating a solvent, heating it to a temperature of the boiling point of the solvent or higher and lower than 600° C. while stirring to prepare a solid-state intermediate; and heating said intermediate to 600° C. or higher under inert gas atmosphere to effect carbonization, to produce said electrode material, wherein a Raman spectrum analysis of said electrode material at the 5145ÅA line of an argon ion laser beam shows a peak $P_A$ in a range of $1580\pm100$ cm$^{-1}$ and a peak $P_B$ in a range of $1360\pm100$ cm$^{-1}$, and a ratio (R) of an intensity $I_B$ of said peak $P_B$ to an intensity $I_A$ of said peak $P_A$, $R=I_B/I_A$, is higher for said electrode material than for said carbonaceous material particles, and said ratio is less than 0.4 for said electrode material, and said carbonaceous material has a plane spacing d002 of a (002) plane of 0.345 nm or less.

14. The process for preparing a non-aqueous solvent secondary battery electrode material according to claim 13, wherein the above organic substance is heavy oil.

15. A process for preparing an electrode material for a non-aqueous solvent secondary battery, which comprises the steps of:

introducing a mixture comprising at least carbonaceous material particles and an organic substance into a mixing and stirring apparatus having a structure that in an inner portion, a reaction room in which paddles rotatable by plural shafts are provided is equipped, the inner wall surface of the reaction room is formed substantially along the outermost line of rotation of the paddles and the paddles are arranged so that side surfaces facing to each other are engaged, or a mixing and stirring apparatus in an inner portion of which a reaction room in which paddles fixed to a shaft with different phases and rotatable by the shaft are arranged is equipped, the inner wall surface of the reaction room is formed substantially along the outermost line of rotation of the paddles and further a crushing mechanism generating vortex flow by high speed rotation is equipped, heating it to a temperature of 50° C. or higher and lower than 600° C. while stirring by rotating the shaft(s) to prepare an intermediate; and heating said intermediate to 600° C. or higher under inert gas atmosphere to effect carbonization, to produce said electrode material, wherein a Raman spectrum analysis of said electrode material at the 5145Å line of an argon ion laser beam shows a peak $P_A$ in a range of $1580\pm100$ cm$^{-1}$ and a peak $P_B$ in a range of $1360\pm100$ cm$^{-1}$, and a ratio (R) of an intensity $I_B$ of said peak $P_B$ to an intensity $I_A$ of said peak $P_A$, $R=I_B/I_A$, is higher for said electrode material than for said carbonaceous material, and said ratio is less than 0.4 for said electrode material, and said carbonaceous material has a plane spacing d002 of a (002) plane of 0.345 nm or less.

* * * * *